(12) United States Patent
Duer et al.

(10) Patent No.: US 11,544,384 B2
(45) Date of Patent: *Jan. 3, 2023

(54) APPLYING MACHINE LEARNING TECHNIQUES TO DISCOVER SECURITY IMPACTS OF APPLICATION PROGRAMMING INTERFACES

(71) Applicant: International Business Machines Corporation, Armonk, NY (US)

(72) Inventors: Kristofer A. Duer, Manchester, NH (US); John T. Peyton, Jr., Arlington, MA (US); Babita Sharma, Missassauga (CA); David E. Stewart, Bedford, MA (US); Jason N. Todd, Lunenburg, MA (US); Shu Wang, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/382,362

(22) Filed: Apr. 12, 2019

(65) Prior Publication Data

US 2019/0236483 A1 Aug. 1, 2019

Related U.S. Application Data

(63) Continuation of application No. 15/356,536, filed on Nov. 18, 2016, now Pat. No. 10,339,320.

(51) Int. Cl.
*G06F 21/57* (2013.01)
*G06F 21/62* (2013.01)
(Continued)

(52) U.S. Cl.
CPC ............ *G06F 21/577* (2013.01); *G06F 21/52* (2013.01); *G06F 21/6281* (2013.01); *G06N 20/00* (2019.01)

(58) Field of Classification Search
None
See application file for complete search history.

(56) References Cited

U.S. PATENT DOCUMENTS 7,647,636 B2 * 1/2010 Polyakov .............. G06F 21/566
  713/187
7,779,472 B1 8/2010 Lou
(Continued)

FOREIGN PATENT DOCUMENTS

WO  WO2016004073 A1  1/2016

OTHER PUBLICATIONS

Pistoia, "Combining Static Analysis and Machine Learning for Industrial-quality Information-flow-Security Enforcement", Workshop on Software Correctness and Reliability, ETH Zürich, Oct. 2015, 68 pages.

(Continued)

*Primary Examiner* — Benjamin E Lanier
(74) *Attorney, Agent, or Firm* — Yee & Associates, P.C.

(57) ABSTRACT

A computer-implemented method includes obtaining, by a processor, existing security information for static application security testing (SAST). The method also includes using, by the processor, the existing security information to discover, by a machine capable of learning, new security information. The method also includes improving, by the processor, security of a computer using the new security information.

3 Claims, 5 Drawing Sheets

(51) Int. Cl.
*G06F 21/52* (2013.01)
*G06N 20/00* (2019.01)

(56) References Cited

U.S. PATENT DOCUMENTS

| | | | |
|---|---|---|---|
| 8,239,947 B1 | 8/2012 | Glick et al. | |
| 8,510,827 B1 | 8/2013 | Leake et al. | |
| 8,555,385 B1* | 10/2013 | Bhatkar | G06F 21/556 |
| | | | 726/22 |
| 8,683,546 B2 | 3/2014 | Dunagan et al. | |
| 8,806,648 B2 | 8/2014 | Guy et al. | |
| 8,938,508 B1 | 1/2015 | McCorkendale et al. | |
| 9,128,728 B2 | 9/2015 | Siman | |
| 9,141,806 B2 | 9/2015 | Siman | |
| 9,171,160 B2 | 10/2015 | Vincent et al. | |
| 9,306,974 B1 | 4/2016 | Aziz et al. | |
| 9,882,930 B2 | 1/2018 | Holt | |
| 10,181,033 B2* | 1/2019 | Yan | G06F 21/56 |
| 2006/0248310 A1* | 11/2006 | Kavalam | G06F 11/3485 |
| | | | 712/11 |
| 2006/0265749 A1* | 11/2006 | Kwon | G06F 21/562 |
| | | | 726/24 |
| 2010/0180344 A1* | 7/2010 | Malyshev | G06F 21/53 |
| | | | 726/23 |
| 2011/0231936 A1* | 9/2011 | Williams | G06F 21/577 |
| | | | 726/25 |
| 2011/0239103 A1 | 9/2011 | Mercuri | |
| 2012/0011493 A1 | 1/2012 | Singh et al. | |
| 2013/0239219 A1 | 9/2013 | Siman | |
| 2013/0282630 A1 | 10/2013 | Attenberg et al. | |
| 2014/0020046 A1 | 1/2014 | Heitzman | |
| 2014/0130015 A1 | 5/2014 | Beskrovny et al. | |
| 2015/0227746 A1 | 8/2015 | Chen et al. | |
| 2015/0248543 A1* | 9/2015 | Yoshinari | G06F 21/6218 |
| | | | 726/28 |
| 2015/0310195 A1 | 10/2015 | Bailor et al. | |
| 2016/0078361 A1 | 3/2016 | Brueckner et al. | |
| 2016/0094574 A1* | 3/2016 | Hsueh | G06F 21/566 |
| | | | 726/23 |
| 2016/0154960 A1 | 6/2016 | Sharma et al. | |
| 2016/0182553 A1* | 6/2016 | Tripp | G06F 21/577 |
| | | | 726/25 |
| 2016/0217029 A1* | 7/2016 | Yoon | G06F 9/54 |
| 2016/0294851 A1 | 10/2016 | Langton et al. | |
| 2016/0315960 A1 | 10/2016 | Teilhet | |
| 2017/0070500 A1 | 3/2017 | Hockey et al. | |
| 2017/0223046 A1* | 8/2017 | Singh | H04L 63/1491 |
| 2017/0318045 A1 | 11/2017 | Johns et al. | |
| 2018/0144127 A1 | 5/2018 | Duer et al. | |

OTHER PUBLICATIONS

Sotirov, "Automatic Vulnerability Detection Using Static Source Code Analysis", University of Alabama, Department of Computer Science, Copyright 2005, 118 pages.

Yamaguchi et al., "Automatic Inference of Search Patterns for Taint-Style Vulnerabilities", 2015 IEEE Symposium on Security and Privacy, Copyright 2015, 16 pages.

Office Action, dated Nov. 18, 2016, regarding U.S. Appl. No. 15/356,536, 40 pages.

Notice of Allowance, dated Feb. 13, 2019, regarding U.S. Appl. No. 15/356,536, 11 pages.

List of IBM Patents or Patent Applications Treated as Related, 2 pages. (Appendix P).

\* cited by examiner

APPLYING MACHINE LEARNING TECHNIQUES TO DISCOVER SECURITY IMPACTS OF APPLICATION PROGRAMMING INTERFACES

CROSS REFERENCE TO RELATED APPLICATION

This Application is a Continuation Application of U.S. patent application Ser. No. 15/356,536, filed Nov. 18, 2016, the contents of which are hereby incorporated by reference.

BACKGROUND

1. Field

The disclosure relates generally to computer security, and more specifically, to techniques for automatically identifying potentially compromised application programming interfaces in large software architectures and taking action to secure a computer upon detecting a potentially compromised application programming interface.

2. Description of the Related Art

As used throughout this document, the term "API" refers to an application programming interface, and the term "APIs" refers to two or more application programming interfaces. An API is a set of routines, protocols, and/or tools for building software applications. An API specifies how software components should interact. For example, an API could be any entry point for other software in a library of a computer.

An API may make developing programs easier by providing building blocks which are put together by a programmer. An API may be implemented as hardware or software. An API may be used in a wide variety of environments, including but not limited to web-based systems, operating systems, computer hardware, computer software, and software libraries. Thus, for example, an API may allow a software program to request information from a computer library, and then facilitate the transfer of the requested information from the computer library to the requesting software program.

Practically, most software used on computers today has many APIs. An operating system may have many thousands of APIs. Large enterprise systems may have even millions of APIs, or more.

However, one potential source of security threats to a computer, a network, an entire enterprise may be via attacking one or more APIs. Certain types of APIs may be compromised. When "compromised", the API is subjected to malicious intervention, such as, but not limited to, a virus, or to perform or not to perform some action the API was not originally programmed to perform. For example, an API can be forced to pass information that is unfiltered when it was supposed to filter information. In another example, an API can be caused to transmit information that it was not supposed to transmit.

Thus, in the field of cyber security, or computer security generally, a problem often arises to identify either compromised APIs or APIs which are vulnerable to compromise. Once compromised APIs are discovered, action is taken to close the security gap in any number of ways, including but not limited to reprogramming the API, isolating the API, replacing the API, or isolating the computer with the API from a network.

However, discovering comprised or potentially compromised APIs is a laborious manual process. This fact is a problem in the field of computer security. One reason for this problem is that APIs can be complex, and the potential threats may be hidden. Thus, human subject matter experts must often manually review APIs when a threat arises or is detected. In addition, there are simply too many APIs to effectively manually review. However, in order to fully understand the security posture of an application, all of the APIs must be understood. This manual process is time intensive and expensive.

Techniques simply do not exist for automatically analyzing APIs to discover if there are APIs that are compromised or potentially compromised. The process for automatically detecting compromised or potentially compromised APIs was not previously made an automatic process because of the complexity of the problem, as well as the potential existence of sometimes non-obvious interactions of APIs with other software in a complex system. Thus, a need exists to solve these problems.

The problem with API security is known and has been addressed by software that analyzes APIs directly after using this security information, such as, for example, static analysis security testing (SAST) software. However, in the known art, SAST software uses the APIs that have been identified and marked-up by a human subject matter expert to perform a vulnerability scan. SAST software cannot be used to analyze all APIs, not only because the APIs have not been marked up in a way that can be consumed by SAST software, but also because of the volume of APIs. Another problem is that the manual mark-up process is time consuming and error prone.

There have been some attempts at automatically finding scanning APIs. For example, the authors are aware of such work as "Automatic Inference of Search Patterns for Taint-Style Vulnerabilities" available from the Institute of Electrical and Electronics Engineers (IEEE) organization. This paper provides for automatic derivation of pattern matches using a graph database representation. This paper states, "while our approach shares a similar motivation, it differs in that it automatically infers search patterns and thus the analyst only needs to define a set of security-sensitive sinks to start auditing an unknown code base." However, this approach begs the question of how to automatically identify sinks in the first place, and then remove this time consuming and expensive manual input step. In other words, while the known art may find ways of automatically analyzing sinks, sources, and taints in APIs, two problems remain: identifying the potentially problematic APIs and their sinks, sources, and taints in the first place, and also automatically marking-up APIs for consumption by existing SAST software. A need also exists to address these problems.

SUMMARY

According to one embodiment of the present invention, a computer-implemented method is provided. The computer-implemented method includes obtaining, by a processor, existing security information for static application security testing (SAST). The computer-implemented method also includes using, by the processor, the existing security information to discover, by a machine capable of learning, new security information. The computer-implemented method also includes improving, by the processor, security of a computer using the new security information.

An advantage of this embodiment of the present invention is that it provides for identifying potentially problematic APIs and their sinks, sources, and taints. Another advantage of this embodiment of the present invention is automatically marking-up APIs for consumption by existing static analysis security testing (SAST) software.

Another advantage of this embodiment of the present invention is that the percentage of correct classifications of taint propagators, sources, and sinks in application programming interfaces (APIs) are dramatically increased, relative to prior security methods, including manual methods. The increased percentage of correct classifications may be up to 99.8% relative to prior manual methods. Another advantage of this embodiment of the present invention is that complex software with tens of thousands, or even millions, of APIs may be analyzed quickly, efficiently, and accurately for security threats. Another advantage of this embodiment of the present invention is that machine learning allows new APIs or new versions of APIs to be quickly, efficiently, and accurately scanned even when new computer or human languages previously not analyzed by a human are to be analyzed. Thus, an advantage of this embodiment of the present invention is that the security of a computer, including both hardware and software, may be dramatically increased in less time. During active threats or attacks on a computer or a network, this embodiment of the present invention allows for same day security information and more rapid response to threats relative to prior methods for securing hardware and software.

The computer-implemented method also includes an embodiment where the existing security information includes existing markup information, including source information, sink information, and taint propagator information. In prior methods, source information, sink information, and taint propagator information are never automatically identified, and is provided manually by a user who is a subject matter expert. No prior techniques exist to use machine learning to identify sources, sinks, and taint propagators automatically.

The computer implemented method also includes an embodiment in which an additional operation is provided to provide the new security information to a static analysis analyzer, wherein the new security information includes new markup information. Thus, this embodiment of the present invention allows for interfacing automatic identification described above with static analysis analyzers, which currently rely on manual input, or at least manually inputted information regarding which APIs to search.

In a related embodiment, the new security information is for a new application programming interface (API). In addition to the above-described operations, the method also includes extracting features from the new API. The features include whether the new API is static, a type of technology to which the new API relates, a method name, an argument type, a likelihood of exploitation, a return type of the new API, a class, a package, a setter, a class specific feature, or a method description. Thus, the illustrative embodiments also include the advantage of providing for the construction of new or cleansed APIs.

In still another embodiment, the processor improves the security of the computer using the new security information, which further includes identifying a malicious code attempting to access an application programming interface (API) by the processor and using the new security information; and the processor preventing access by the malicious code to the computer. Thus, an advantage of this embodiment of the present invention is to improve security of a computer relative to existing techniques, which more slowly recognize threats, address threats more slowly, or may not recognize threats at all.

Another embodiment of the present invention includes a computer-implemented method of improving security of a tangible computer. In this embodiment, the method includes a processor normalizing a plurality of application programming interfaces (APIs) on the tangible computer to form a plurality of normalized APIs, wherein the plurality of APIs include first APIs with unknown security information. This method also includes the processor using a machine learning algorithm to analyze the plurality of normalized APIs by identifying a subset of the plurality of APIs that have semantics of a feature. The feature is selected from the group consisting of a source, a sink, and a taint propagator. This method also includes the processor performing static analysis security testing only on the subset of the plurality of APIs. This method also includes the processor identifying a compromised API from the subset of the plurality of APIs using the static analysis security testing. This method also includes the processor improving the security of the computer by taking an action on the computer as a result of identifying the compromised API.

An advantage of this embodiment of the present invention is that it provides for identifying potentially problematic APIs and their sinks, sources, and taints. Another advantage of this embodiment of the present invention is automatically marking-up APIs for consumption by existing static analysis security testing (SAST) software.

An advantage of this embodiment of the present invention is that the percentage of correct classifications of taint propagators, sources, and sinks in application programming interfaces (APIs) are dramatically increased relative to prior security methods, including manual methods. The increased percentage of correct classifications may be up to 99.8% relative to prior methods. Another advantage of this embodiment of the present invention is that complex software, with tens of thousands or even millions of APIs, may be analyzed quickly, efficiently, and accurately for security threats. Another advantage of this embodiment of the present invention is that machine learning allows new APIs or new versions of APIs to be quickly, efficiently, and accurately scanned even when new computer or human languages, previously not analyzed by a human, are to be analyzed. Thus, an advantage of this embodiment of the present invention is that the security of a computer, including both hardware and software, may be dramatically increased in less time. During active threats or attacks on a computer or a network, this embodiment of the present invention allows for same day security information and more rapid response to threats relative to prior methods for securing hardware and software.

In a related embodiment of the present invention, the computer-implemented method described above also includes the processor automatically marking-up the subset of the plurality of APIs, highlights all sources of taint, all sinks, and all taint propagators. An advantage of this particular embodiment is that it allows for rapid manual checking and identification of potentially problematic APIs. Another advantage of this particular embodiment is that it allows a machine learning process to automatically scan APIs on a computer more rapidly and accurately.

The embodiments of the present invention also contemplate a tangible computer program product containing code that may be executed by a processor to implement any of the computer-implemented methods described herein. The embodiments of the present invention also contemplate a computer including a processor, a memory, a bus, and code stored in the memory which, when executed by the processor, implements any of the computer-implemented methods described herein. The embodiments of the present invention also contemplate using the methods described herein to provide network security by protecting individual computers on the network from threats to APIs.

DETAILED DESCRIPTION

Figure 1:
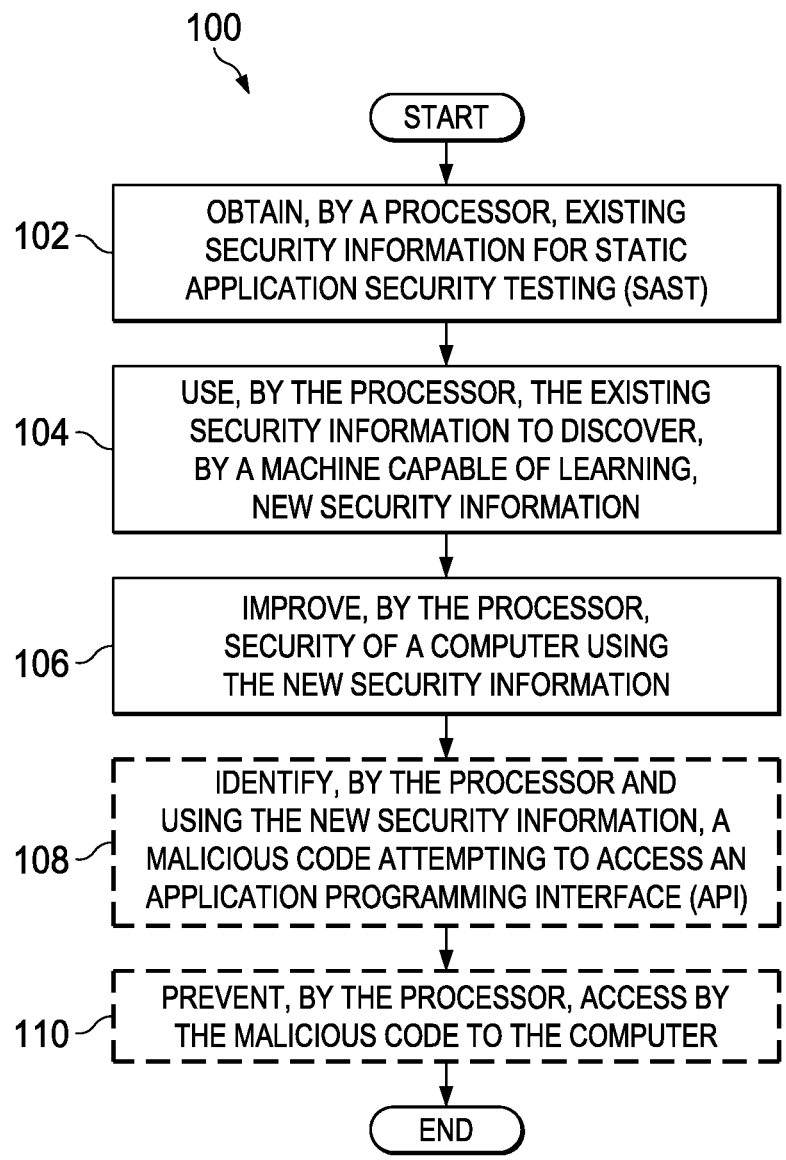
FIG. 1 is a flowchart of a computer implemented method, in accordance with an illustrative embodiment.

The illustrative embodiments provide for applying machine learning techniques to discover a security impact of application programming interfaces (APIs). The illustrative embodiments address the previously unsolved problem of identifying potentially problematic APIs and their sinks, sources, and taints. The illustrative embodiments also address the previously unsolved problem of automatically marking-up APIs for consumption by existing static analysis security testing (SAST) software.

Static analysis for security testing (SAST) often uses security rules or markup information. These rules encapsulate properties of the APIs that are relevant to finding security vulnerabilities using data-flow analysis. Some examples of this markup are "source of taint", "sink of taint", and "taint-propagator". These summaries are useful because they can be generated once and persisted in some form, such as in a database, and can be made available to anyone that needs or uses the information. The static analysis engine can use this information without the need to do any parsing or analysis of the library code, thereby saving on time and memory.

There are some cases where access to the library code is not available and understanding the security information in this respect allows for proper data flow analysis. Most markups are written manually by security experts who understand the functionality provided by the API. The markup process is time-consuming and error-prone.

The illustrative embodiments provide techniques for automatic generation of markup in APIs. When the user provides an application for static analysis for security testing (SAST), the dependencies or the libraries used by the application require this markup information. If it is not currently present for them, the markup can be inferred using the illustrative embodiments described herein.

The illustrative embodiments recognize and take into account that understanding and applying security information to an API is a big data problem. For example, in one commercially-available software architecture, there are over 600,000 APIs with security information, and millions which do not have security information. The known art has not recognized this problem statement formulated in this way.

Thus, the illustrative embodiments recognize and take into account that machine learning is applicable to this previously unidentified problem.

The illustrative embodiments described herein propose using machine learning to solve the problem of understanding security information for APIs which are not part of the current library of manually marked up APIs. In particular, machine learning is used to identify potentially problematic APIs, and to mark them up for use in SAST software.

Proficiently guessing new security information for a new API can be accomplished by using known security information placed on currently understood APIs. This known set may represent the training and test components of the machine learning algorithm of the illustrative embodiments.

There are a variety of different types of security information commonly associated with different APIs. An example of this security information includes a source. A source represents the entry point of untrusted or user controlled data. An example of a source is reading the query string from a URL request.

Another example of this security information includes a sink. A sink is where untrusted data exits in a system in its original form. An example of a sink is a database execute query call using untrusted data as the argument.

Another example of this security information includes a taint propagator. A taint propagator represents the pathway that malicious data flows through in a system. An example of a taint propagator is "String.append".

Each of these types of information involve slightly different ways of understanding how to predict the correct new security information. Each is addressed in turn.

Attention is first turned to a basis for taint propagation. Taint propagation can be described as a "from" area where the taint enters this API, and a "to" area describing how the tainted data exits the API. This characterization results in a two pair combination of "from→to" representing the entirety of the taint propagation process. The process for this piece involves building a map such as ID→("from"→"to" pairs). The term "ID" as used herein is a short form of the word "identifier" or "identification". That ID is then used as the class specific identifier for the normalized API.

Attention is now turned to a basis for a source in APIs. Sources are a binary prediction. An API is either a source of taint or it is not. The normalization feature for this piece is either a "1" (is a source) or a "0" (is not a source). The prediction then can be adjusted to use probabilities for more restrictive applications of an API being a source, or less restrictive allowing for more sources and potentially incorrect ones.

Attention is now turned to a basis for a sink in APIs. Identifying an API in a sink is a binary prediction. It either is a sink or it isn't a sink. The normalization process for this is similar to the basis for a source. The normalization feature for this piece is either a "1" (is a sink) or a "0" (is not a sink).

Attention is now turned to feature extraction. Feeding any set of data into a machine in a structured way requires representing the data on a single line. This single line representation of features to values folds all of the information a single API has about itself into one line for proper consumption by the machine learning algorithm. The term "normalization" refers to this process.

Some features of the API include, but are not limited to, the following: 1. Whether an API is static or not; 2. What kind of technology the API relates to, such as web, database or file system access; 3. The method name itself; 4. The argument types; 5. Likelihood of exploit; 6. Return type of the API; 7. Class; 8. Package; 9. Setter, getter, constructor or other; 10. Method description (javadoc for example).

The illustrative embodiments are highly accurate. For example, in one experiment, the machine learning algorithm was applied to discover new markups from existing markups. The machine learning based algorithm of the illustrative embodiments scanned 31,399 APIs in a software architecture. Compared to a manual search, the machine learning algorithm of the illustrative embodiments correctly classified 98.5% of taint propagators, 97.7% of sources, and 99.8% of sinks in all APIs, all automatically. Thus, the illustrative embodiments represent a substantial improvement over the previous method, which was to manually scan APIs.

In summary, using machine learning to understand API markups that are not previously manually analyzed is very effective. This technique allows a static analysis analyzer for security warnings to have instant support for new frameworks, new APIs for a new version, or even new languages previously not analyzed by a human to have same day security information during a threat or attack.

Stated differently, the main thrust of the illustrative embodiments is to use machine learning to identify APIs that have the semantics of a source of taint, a sink susceptible to tainted data, or a "taint propagator", an API that simply returns the data passed to it without sanitizing it.

In a specific example, library routines are defined as routines whose implementations are not available to analyze. APIs are simply the names of these routines. To do an accurate interprocedural data flow analysis of code that calls library routines, one must understand the semantics of these library routines. Thus, to integrate them into an interprocedural data flow analysis aimed at taint analysis, one must determine whether the API is a source, sink, or taint propagator.

There are two portions of code that the analysis deals with. First, the application code itself, having routine implementations available to the analysis. Second, the library routines called by the application code. The analysis will traverse the bodies or implementations of routines in the application code. When the analysis reaches a call to a library API, the analysis must use what knowledge is given about the semantics of the library call in order to determine the effects on the application code of the call to the library routine.

This is where knowing whether the library is a source, sink, or taint propagator is important. For a taint analysis, one can create a trace through the source code in this fashion. One starts at a library call that is a source, and follows the control and data flow through the application code. If the flow reaches a library call that is a sink, the trace is reported. The trace consists of a series of locations in the code beginning with the call to the source and ending with the sink.

It is precisely the automatic determination of sinks that the illustrative embodiments address, removing the manual input step to this algorithm. The known art provides no process that uses machine learning to identify sources and sinks in APIs.

In another example, the illustrative embodiments provide a way to reduce the manual labor involved in creating the inputs for the taint analysis. The illustrative embodiments thus provide for a technique that precedes the taint analysis. As described above, a taint analysis needs to know which APIs are sources and which are sinks. This information is an input to the analysis, and considers only aspects of the API; there are no characteristics of a trace being considered, as there is no trace at this point. Accordingly, the illustrative embodiments provide an automated way to classify APIs based on their security characteristics using machine learning to do that classification.

FIG. 1 is a flowchart of a computer implemented method depicted in accordance with an illustrative embodiment. Computer-implemented method 100 may be implemented by a processor, such as processor 306 of FIG. 3, any of the clients or servers shown in FIG. 4, or data processing system 500 of FIG. 5.

Computer-implemented method 100 includes obtaining, by a processor, existing security information for static application security testing (SAST) (operation 102). Existing security information may include existing markup information, including source information, sink information, and taint propagator information. The source information may include an entry point of untrusted data. The sink information may include where in an API untrusted data exits a system in original form. The taint propagator information may include a pathway of malicious data flowing through a system.

Computer-implemented method 100 also includes using, by the processor, the existing security information to discover, by a machine capable of learning, new security information (operation 104). A "machine capable of learning" refers to machine learning technology. Machine learning technology is a subfield of computer science that gives computers the ability to learn without being explicitly programmed. Machine learning can be used to devise complex models and algorithms that lend themselves to prediction. The specific workings of machine working algorithms are not part of the present disclosure. Rather, the present disclosure uses existing machine learning algorithms modified to discover and markup APIs with security information as described herein.

Computer-implemented method 100 also includes improving, by the processor, security of a computer using the new security information (operation 106). Improving the security may further include identifying, by the processor and using the new security information, a malicious code attempting to access an application programming interface (API) (operation 108); and preventing, by the processor, access by the malicious code to the computer (operation 110). Improving the security may also include identifying, by the processor and using the new security information, a corrupted application programming interface (API; and isolating, by the processor, the corrupted API.

In an illustrative embodiment, computer-implemented method 100 may terminate after operation 106. However, in another illustrative embodiment, computer-implemented method 100 may include providing the new security information to a static analysis analyzer. The new security information may include new markup information. In still another illustrative embodiment, for computer-implemented method 100, the new security information is for a new API. In this case, computer-implemented method 100 may also optionally include extracting features from the new API, wherein the features include whether the new API is static, a type of technology to which the new API relates, a method name, an argument type, a likelihood of exploitation, a return type of the new API, a class, a package, a setter, a class specific feature, and a method description.

Computer-implemented method 100 may be further varied. More or fewer operations may be present. Thus, computer-implemented method 100 does not necessarily limit the claimed inventions.

Figure 2:
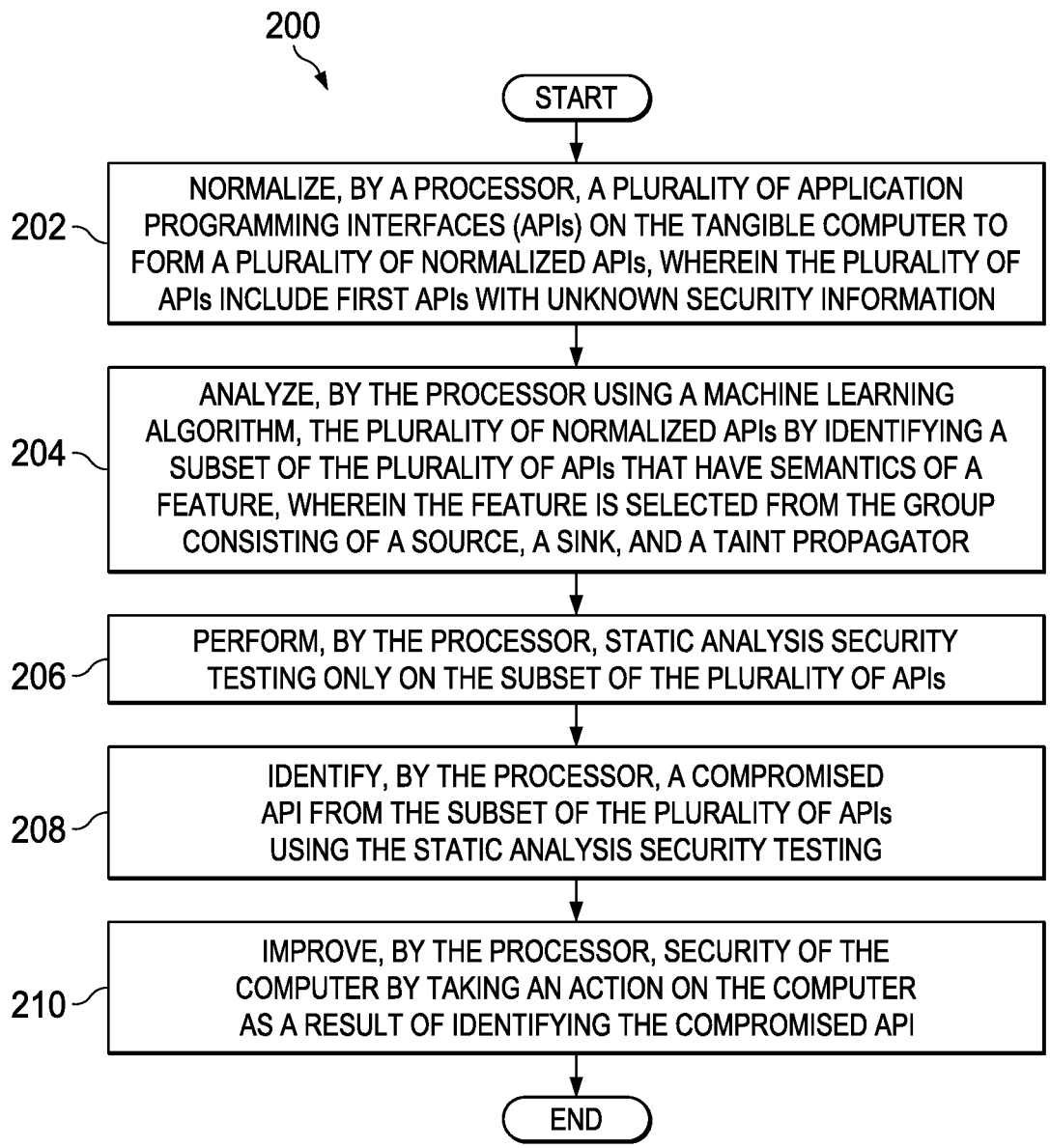
FIG. 2 is a flowchart of a computer-implemented method of improving security of a tangible computer, in accordance with an illustrative embodiment.

FIG. 2 is a flowchart of a computer-implemented method of improving security of a tangible computer, in accordance with an illustrative embodiment. Computer-implemented method 200 may be a variation of computer-implemented method 100 of FIG. 1. Computer-implemented method 200 may be implemented by a processor, such as processor 306 of FIG. 3, any of the clients or servers shown in FIG. 4, or data processing system 500 of FIG. 5.

Computer-implemented method 200 includes normalizing, by a processor, a plurality of application programming interfaces (APIs) on the tangible computer to form a plurality of normalized APIs, wherein plurality of APIs include first APIs with unknown security information (operation 202). In some illustrative embodiments this operation is optional, as the APIs may already be normalized or otherwise parsed.

Computer-implemented method 200 also includes analyzing, by the processor using a machine learning algorithm, the plurality of normalized APIs by identifying a subset of the plurality of APIs that have semantics of a feature, wherein the feature is selected from the group consisting of a source, a sink, and a taint propagator (operation 204). In different illustrative embodiments, the feature may be some other feature. However, in at least one illustrative embodiment, sources, sinks, and taint propagators are the three most common types of features in APIs which may represent security risks. Further features might include entry points through the API arguments or validation routine.

Computer-implemented method 200 also includes performing, by the processor, static analysis security testing only on the subset of the plurality of APIs (operation 206). In different illustrative embodiments, other types of APIs may also be tested, or possibly all APIs may be tested. However, in at least one illustrative embodiment, limiting the number of APIs tested can improve the speed, efficiency, and cost of security testing on a vast number of APIs that may be present in an enterprise or operating system being tested.

Computer-implemented method 200 also includes identifying, by the processor, a compromised API from the subset of the plurality of APIs using the static analysis security testing (operation 208). A compromised API may be an API which has been subjected to an attack, an API that has been modified maliciously, an API that should not be present, an API that should be present that has been deleted or renamed, or other APIs that compromise security. The term "compromised API" also includes APIs that may be at risk for a security breach or vulnerable to an attack.

Computer-implemented method 200 also includes improving, by the processor, security of the computer by taking an action on the computer as a result of identifying the compromised API (operation 210). Improving the security may be any of the actions described with respect to FIG. 1, for example.

Computer-implemented method 200 may be varied. For example, the action may selected from a group consisting of: isolating the compromised API, revising the compromised API into an originally drafted form of the API, removing unexpected code from the compromised API, isolating computers having the compromised API from a network to which the computers are connected. Other actions are possible.

Computer-implemented method 200 may also include more or fewer operations. For example, computer-implemented method 200 may also include prior to normalizing, training, by the processor, the machine learning algorithm by providing to the machine learning algorithm known security information placed on currently understood second APIs in the plurality of APIs. In a different illustrative embodiment, computer-implemented method may also include automatically marking-up, by the processor, the subset of the plurality of APIs, wherein marking-up highlights all sources of taint, all sinks, and all taint propagators. Combinations of these additional operations are also possible.

In an illustrative embodiment, the source may be an entry point of one of untrusted or user controlled data into a particular API. For example, the source may be a query string from a uniform resource locator request. In another illustrative embodiment, the sink may be an exit point of untrusted data in original form from the particular API. For example, the sink may be a database execute query call using untrusted data as an argument of the database execute query call. In still another illustrative embodiment, the taint propagator comprises a pathway through which malicious data flows through a system. For example, the taint propagator may be a "string.append". In another illustrative embodiment htmlEncode validates certain types of attacks.

Figure 3:
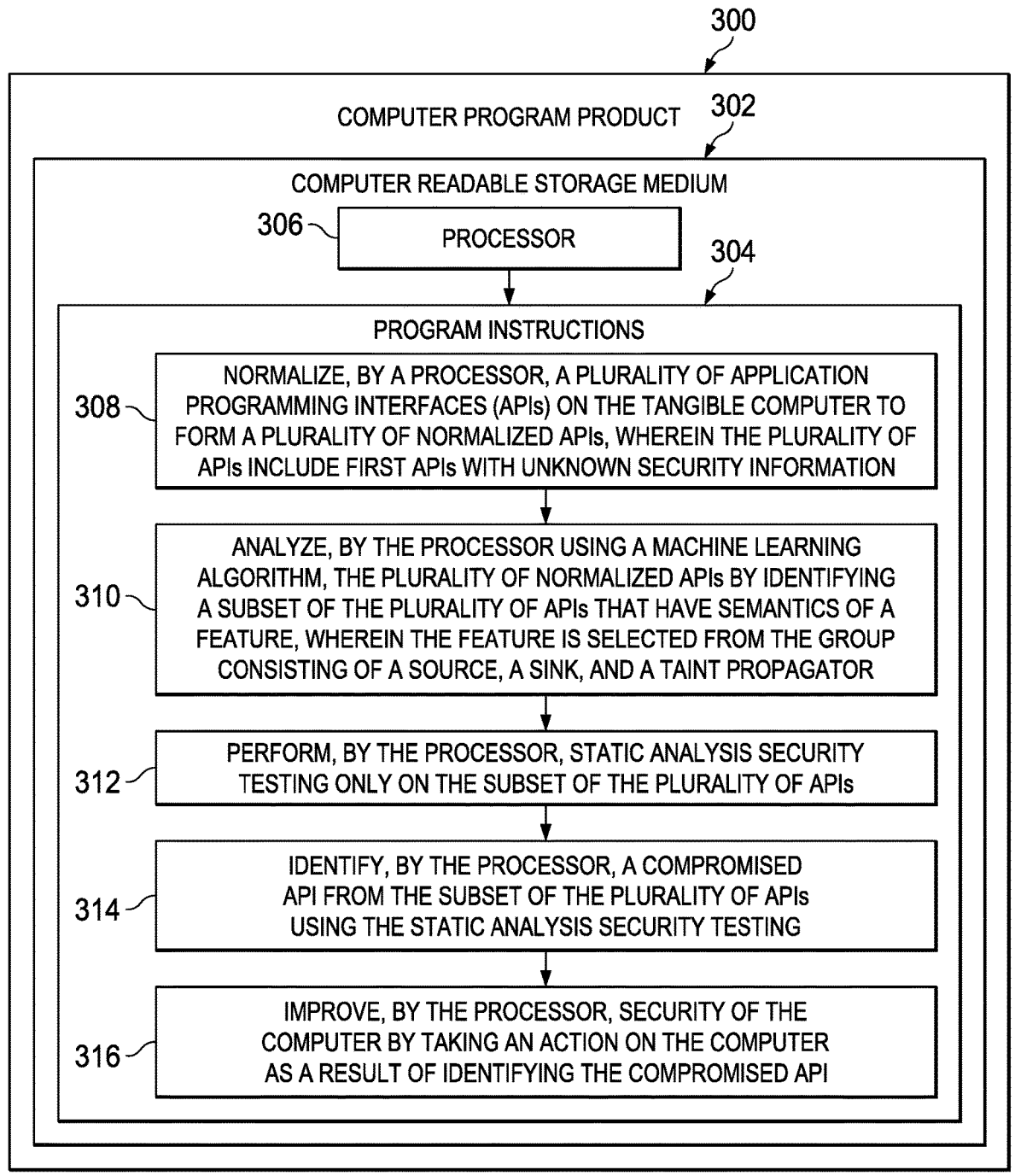
FIG. 3 is a block diagram of a computer program product for improving security of a tangible computer, in accordance with an illustrative embodiment.

FIG. 3 is a block diagram of a computer program product for improving security of a tangible computer in accordance with an illustrative embodiment. Computer program product 300 may include computer readable storage medium 302 having program instructions 304 embodied therewith. Computer readable storage medium 302 is a non-transitory medium embodied as a tangible storage device. Program instructions 304 are executable by processor 306 to cause the processor to perform a method, such as computer-implemented method 100 of FIG. 1 or computer-implemented method 200 of FIG. 2.

For example, the instructions may include instructions to normalize, by the processor, a plurality of application programming interfaces (APIs) on the tangible computer to form a plurality of normalized APIs, wherein the plurality of APIs include first APIs with unknown security information 308. The instructions may also include instructions to analyze, by the processor using a machine learning algorithm, the plurality of normalized APIs by identifying a subset of the plurality of APIs that have semantics of a feature, wherein the feature is selected from the group consisting of a source, a sink, and a taint propagator 310.

The instructions may also include instructions to perform, by the processor static analysis security testing only on the subset of the plurality of APIs 312. The instructions may also include instructions to identify, by the processor, a compromised API from the subset of the plurality of APIs using the static analysis security testing 314. The instructions may also include instructions to improve, by the processor, security of the computer by taking an action on the computer as a result of identifying the compromised API 316.

The program instructions may be varied. For example, the instructions may also include instructions prior to normalizing, to train the machine learning algorithm by providing to the machine learning algorithm known security information placed on currently understood second APIs in the plurality of APIs. The instructions may also include instructions to automatically mark-up the subset of the plurality of APIs, wherein marking-up highlights all sources of taint, all sinks, and all taint propagators.

In an illustrative embodiment, for computer readable storage medium 302, the source may be an entry point of one of untrusted or user controlled data into a particular API. The sink may be an exit point of untrusted data in original form from the particular API. The taint propagator may be a pathway through which malicious data flows through a system. Thus, the illustrative embodiments described with respect to FIG. 3 may be varied and do not necessarily limit the claimed inventions.

Figure 4:
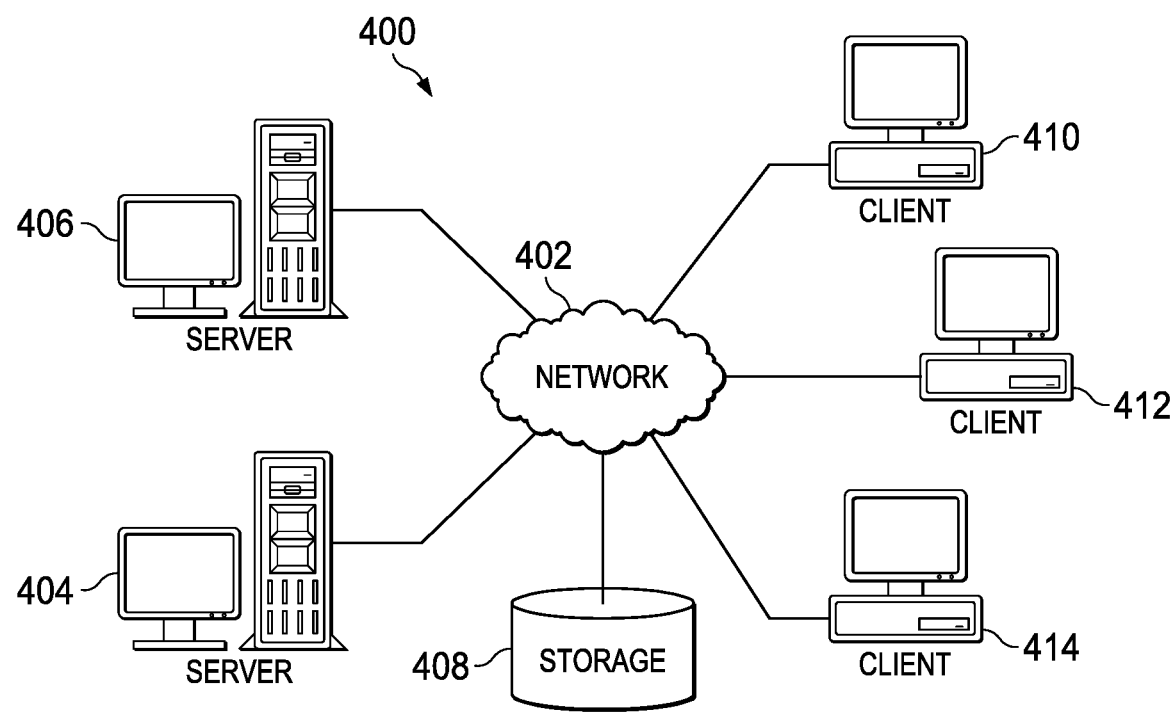
FIG. 4 depicts a pictorial representation of a network of data processing systems in which illustrative embodiments may be implemented.

FIG. 4 depicts a pictorial representation of a network of data processing systems in which illustrative embodiments may be implemented. Network data processing system 400 is a network of computers, data processing systems, and other devices in which the illustrative embodiments may be implemented. Network data processing system 400 contains network 402, which is the medium used to provide communications links between the computers, data processing systems, and other devices connected together within network data processing system 400. Network 402 may include connections, such as, for example, wire communication links, wireless communication links, and fiber optic cables.

In the depicted example, server 404 and server 406 connect to network 402, along with storage 408. Server 404 and server 406 may be, for example, server computers with high-speed connections to network 402. Server 404 and server 406 may provide a set of one or more services to registered users of client devices connected to network 402. For example, server 404 and server 406 may provide a service for implementing any of the methods described above remotely on a client computer.

Client 410, client 412, and client 414 also connect to network 402. Clients 410, 412, and 414 are clients of server 404 and server 406. Further, server 404 and server 406 may provide information, such as boot files, operating system images, and software applications to clients 410, 412, and 414.

In this example, clients 410, 412, and 414 are illustrated as desktop or personal computers with wire or wireless communication links to network 402. However, it should be noted that clients 410, 412, and 414 are meant as examples only. In other words, clients 410, 412, and 414 may include other types of data processing systems, such as, for example, laptop computers, handheld computers, smart phones, cellular phones, smart watches, personal digital assistants, gaming devices, kiosks, set top boxes, and the like. Registered users of clients 410, 412, and 414 may utilize clients 410, 412, and 414 to access the social media services provided by server 404 and server 406.

Storage 408 is a network storage device capable of storing any type of data in a structured format or an unstructured format. In addition, storage 408 may represent a set of one or more network storage devices. Storage 408 may store, for example, names and identification information for a plurality of different registered users; identification of a plurality of different client devices corresponding to the registered users; user profiles corresponding to each of the registered users that may include frequently used hashtags and preferences; et cetera. Further, storage 408 also may store other data, such as authentication or credential data that may include user names, passwords, and biometric data associated with the plurality of different registered users, for example.

In addition, it should be noted that network data processing system 400 may include any number of additional server devices, client devices, and other devices not shown. Program code located in network data processing system 400 may be stored on a computer readable storage medium and downloaded to a computer or data processing system for use. For example, program code may be stored on a computer readable storage medium on server 404, which may be for example computer readable storage medium 302 of FIG. 3, and downloaded to client 410 over network 402 for use on client 410.

In the depicted example, network data processing system 400 may be implemented as a number of different types of communication networks, such as, for example, an internet, an intranet, a local area network (LAN), a wide area network (WAN), or any combination thereof. FIG. 4 is intended as an example, and not as an architectural limitation for the different illustrative embodiments.

Figure 5:
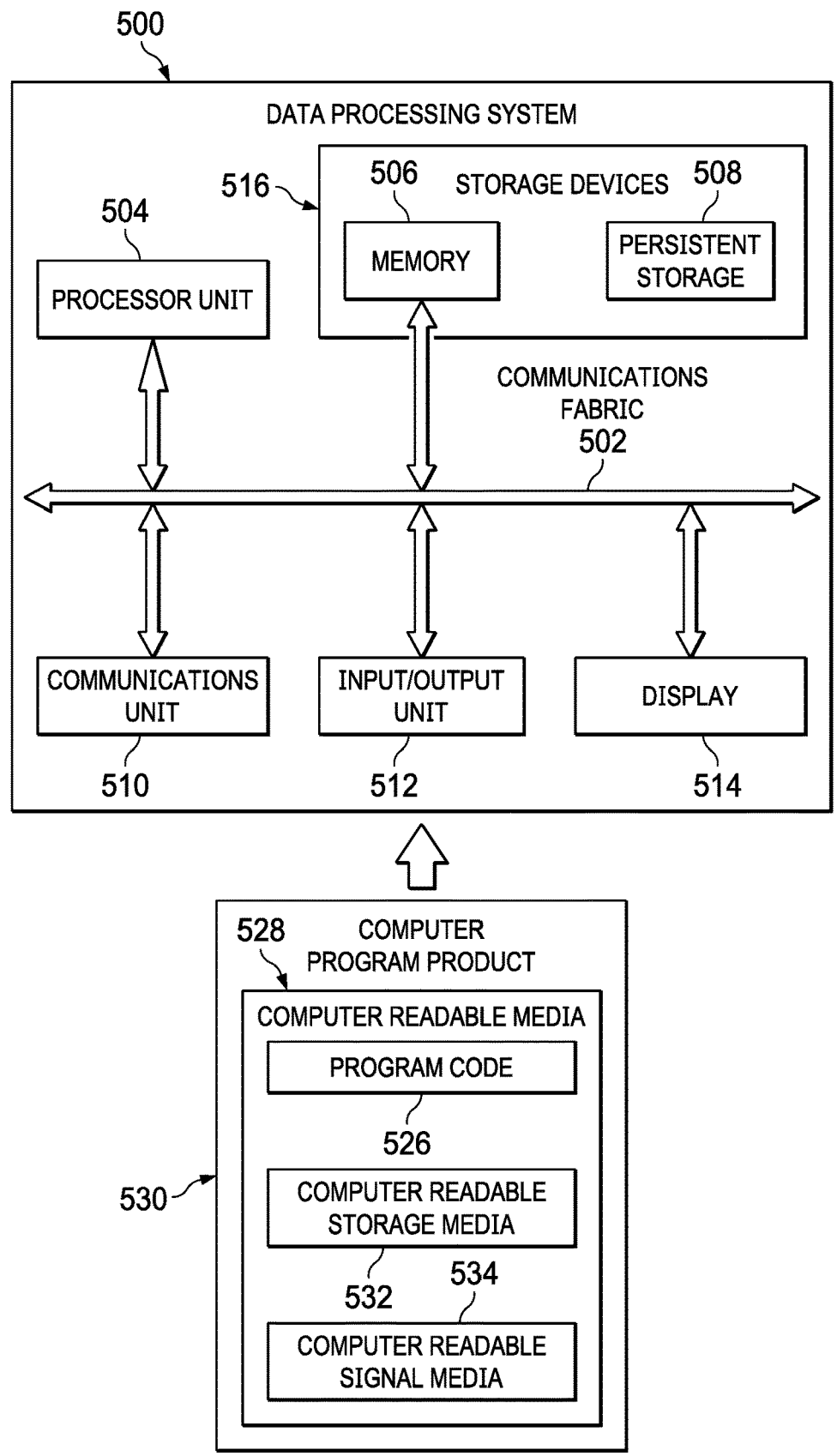
FIG. 5 is a diagram of a data processing system, in accordance with an illustrative embodiment.

With reference now to FIG. 5, a diagram of a data processing system is depicted in accordance with an illustrative embodiment. Data processing system 500 is an example of a computer, such as server 404 in FIG. 4, in which computer readable program code or program instructions implementing processes of illustrative embodiments may be located. In this illustrative example, data processing system 500 includes communications fabric 502, which provides communications between processor unit 504, memory 506, persistent storage 508, communications unit 510, input/output unit 512, and display 514.

Processor unit 504 serves to execute instructions for software applications and programs that may be loaded into memory 506. Processor unit 504 may be a set of one or more hardware processor devices or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 506, in these examples, may be, for example, a random access memory, or any other suitable volatile or non-volatile storage device. Persistent storage 508 may take various forms, depending on the particular implementation. For example, persistent storage 508 may contain one or more devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in this example, provides for communication with other computers, data processing systems, and devices via a network, such as network 402 in FIG. 4. Communications unit 510 may provide communications using both physical and wireless communications links. The physical communications link may utilize, for example, a wire, cable, universal serial bus, or any other physical technology to establish a physical communications link for data processing system 500. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 500.

Input/output unit 512 allows for the input and output of data with other devices that may be connected to data processing system 500. For example, input/output unit 512 may provide a connection for user input through a keypad, keyboard, and/or some other suitable input device. Display 514 provides a mechanism to display information to a user and may include touch screen capabilities to allow the user to make on-screen selections through user interfaces or input data, for example.

Instructions for the operating system, applications, and/or programs may be located in storage devices 516, which are in communication with processor unit 504 through communications fabric 502. In this illustrative example, the instructions are in a functional form on persistent storage 508. These instructions may be loaded into memory 506 for running by processor unit 504. The processes of the different embodiments may be performed by processor unit 504 using computer implemented program instructions, which may be located in a memory, such as memory 506. These program instructions are referred to as program code, computer usable program code, or computer readable program code that may be read and run by a processor in processor unit 504. The program code, in the different embodiments, may be embodied on different physical computer readable storage devices, such as memory 506 or persistent storage 508.

Program code 526 is located in a functional form on computer readable media 528 that is selectively removable and may be loaded onto or transferred to data processing system 500 for running by processor unit 504. Program code 526 and computer readable media 528 form computer program product 530. In one example, computer readable media 528 may be computer readable storage media 532 or computer readable signal media 534. Computer readable storage media 532 may include, for example, an optical or magnetic disc that is inserted or placed into a drive or other device that is part of persistent storage 508 for transfer onto a storage device, such as a hard drive, that is part of persistent storage 508. Computer readable storage media 532 also may take the form of a persistent storage, such as a hard drive, a thumb drive, or a flash memory that is connected to data processing system 500. In some instances, computer readable storage media 532 may not be removable from data processing system 500.

Alternatively, program code 526 may be transferred to data processing system 500 using computer readable signal media 534. Computer readable signal media 534 may be, for example, a propagated data signal containing program code 526. For example, computer readable signal media 534 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 526 may be downloaded over a network to persistent storage 508 from another device or data processing system through computer readable signal media 534 for use within data processing system 500. For instance, program code stored in a computer readable storage media in a data processing system may be downloaded over a network from the data processing system to data processing system 500. The data processing system providing program code 526 may be a server computer, a client computer, or some other device capable of storing and transmitting program code 526.

The different components illustrated for data processing system 500 are not meant to provide architectural limitations to the manner in which different embodiments may be implemented. The different illustrative embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a computer readable storage device in data processing system 500 is any hardware apparatus that may store data. Memory 506, persistent storage 508, and computer readable storage media 532 are examples of physical storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The present invention may be a system, a method, and/or a computer program product. The computer program product may include a computer readable storage medium or media having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, illustrative embodiments of the present invention provide a computer implemented method, computer system, and computer program product for improving security on a computer system by identifying compromised or potentially compromised APIs using machine learning algorithms. Optionally, only identified APIs may be subjected to static testing, as is known in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of improving security of a tangible computer, the method comprising:

training, by the processor, a machine learning algorithm by providing to the machine learning algorithm known security information placed on currently understood second APIs in a plurality of application programming interfaces (APIs);

normalizing, by a processor, the plurality of application programming interfaces (APIs) to form a plurality of normalized APIs, wherein the plurality of APIs include first APIs with unknown security information;

analyzing, by the processor using the machine learning algorithm, the plurality of normalized APIs by identifying a subset of the plurality of APIs that have semantics of a feature, wherein the feature is selected from the group consisting of a source, a sink, and a taint propagator;

performing, by the processor, static analysis security testing only on the subset of the plurality of APIs;

identifying, by the processor, a compromised API from the subset of the plurality of APIs using the static analysis security testing;

improving, by the processor, security of the computer by taking an action on the computer as a result of identifying the compromised API; and automatically marking-up, by the processor, the subset of the plurality of APIs, wherein marking-up highlights sources of taint, sinks, and taint propagators.

2. A computer-implemented method of improving security of a tangible computer, the method comprising:

training, by the processor, a machine learning algorithm by providing to the machine learning algorithm known security information placed on currently understood second APIs in a plurality of application programming interfaces (APIs);

normalizing, by a processor, the plurality of application programming interfaces (APIs) to form a plurality of normalized APIs, wherein the plurality of APIs include first APIs with unknown security information;

analyzing, by the processor using the machine learning algorithm, the plurality of normalized APIs by identifying a subset of the plurality of APIs that have semantics of a feature, wherein the feature is selected from the group consisting of a source, a sink, and a taint propagator;

performing, by the processor, static analysis security testing only on the subset of the plurality of APIs;

identifying, by the processor, a compromised API from the subset of the plurality of APIs using the static analysis security testing;

improving, by the processor, security of the computer by taking an action on the computer as a result of identifying the compromised API;

wherein:

the source comprises an entry point of one of untrusted or user controlled data into a particular API;

the sink comprises an exit point of untrusted data in original form from the particular API;

the taint propagator comprises a pathway through which malicious data flows through a system;

the source comprises a query string from a uniform resource locator request;

the sink comprises a database execute query call using untrusted data as an argument of the database execute query call; and the taint propagator comprises a "string.append".

3. A computer program product for improving security of a tangible computer, the computer program product comprising a computer readable storage medium having program instructions embodied therewith, the program instructions executable by a processor to cause the processor to:

training, by the processor, a machine learning algorithm by providing to the machine learning algorithm known security information placed on currently understood second APIs in plurality of application programming interfaces (APIs);

normalize the plurality of application programming interfaces (APIs) to form a plurality of normalized APIs, wherein the plurality of APIs include first APIs with unknown security information;

analyze, using a machine learning algorithm, the plurality of normalized APIs by identifying a subset of the plurality of APIs that have semantics of a feature, wherein the feature is selected from the group consisting of a source, a sink, and a taint propagator;

perform static analysis security testing only on the subset of the plurality of APIs;

identify a compromised API from the subset of the plurality of APIs using the static analysis security testing;

improve security of the computer by taking an action on the computer as a result of identifying the compromised API; and automatically mark-up the subset of the plurality of APIs, wherein marking-up highlights sources of taint, sinks, and taint propagators.

* * * * *